US005323508A

United States Patent [19]

Sheldrake

[11] Patent Number: 5,323,508

[45] Date of Patent: Jun. 28, 1994

[54] CLEANING APPARATUS FOR ROOF GLAZING

[75] Inventor: Norman G. Sheldrake, Bishops Stortford, United Kingdom

[73] Assignee: Aston International Limited, United Kingdom

[21] Appl. No.: 821,015

[22] Filed: Jan. 15, 1992

[51] Int. Cl.[5] .......................... B60S 1/44; B60S 1/46; B60S 1/02

[52] U.S. Cl. .......................... 15/250.22; 15/250.001; 15/250.04; 15/250.11; 15/250.26; 15/250.36; 15/52.1; 15/103

[58] Field of Search ........... 15/250.29, 250.22, 250.23, 15/250.13, 250.11, 250.24, 250.25, 250.26, 250.39, 250.36, 103, 103.5, 179, 52, 52.1, 53.2, 250.04, 50.3, 250.12, 250.001

[56] References Cited

U.S. PATENT DOCUMENTS

| | | | |
|---|---|---|---|
| 954,158 | 4/1910 | Arzt | 15/250.22 |
| 1,391,754 | 9/1921 | Bair | 15/52 |
| 1,689,163 | 10/1928 | Sukert | 15/250.22 |
| 2,615,190 | 10/1952 | Shaw et al. | 15/250.23 |
| 2,648,087 | 8/1953 | Kiker | 15/250.29 |
| 2,648,866 | 8/1953 | Christos | 15/250.11 |
| 2,829,394 | 4/1958 | Brigmon | 15/250.23 |
| 3,768,109 | 10/1973 | Wardell | 15/182 |
| 3,772,723 | 11/1973 | Krimm | 15/53.3 |
| 3,892,006 | 7/1975 | Yasumoto | 15/250.22 |
| 4,301,566 | 11/1981 | Weigele | 15/53.2 |
| 4,490,877 | 1/1985 | Drumm | 15/182 |

FOREIGN PATENT DOCUMENTS

| | | | |
|---|---|---|---|
| 2030566 | 12/1971 | Fed. Rep. of Germany | 15/250.29 |
| 3600198 | 7/1987 | Fed. Rep. of Germany | 15/250.24 |
| 1303305 | 7/1962 | France | 15/250.29 |
| 1328553 | 4/1963 | France | 15/250.29 |
| 0282151 | 12/1986 | Japan | 15/250.29 |
| 0184957 | 8/1987 | Japan | 15/250.39 |
| 0141856 | 6/1988 | Japan | 15/250.13 |
| 1602440 | 10/1990 | U.S.S.R. | 15/52.1 |
| 2029691 | 3/1980 | United Kingdom | 15/250.24 |
| 2173995 | 10/1986 | United Kingdom | 15/250.29 |

*Primary Examiner*—Stephen F. Gerrity
*Assistant Examiner*—Gary K. Graham
*Attorney, Agent, or Firm*—Lee, Mann, Smith, McWilliams, Sweeney & Ohlson

[57] ABSTRACT

Cleaning apparatus for the glazing in an atrium-type roof structure (10) comprises an elongate brush (14) rotating about its axis and mounted at opposite ends in carriages (18, 20) running on guide rails (16, 16A) which can move non-synchronously so as to change the angular orientation of the brush, which is formed with two telescopic parts (22, 24) to enable it to change its length as its angular orientation changes (FIGS. 1 and 3). Also described is apparatus for cleaning a barrel arch-type glazed roof structure.

15 Claims, 16 Drawing Sheets

CLEANING APPARATUS FOR ROOF GLAZING

FIELD OF THE INVENTION

This invention relates to apparatus for cleaning roof glazing, more especially the non-planar glazed roof structures employed in large covered areas such as shopping precincts, for example atrium-type glazed roof structures and barrel arch-type glazed roof structures.

BACKGROUND TO THE INVENTION

It is known, for the purpose of cleaning planar window glazing in tower blocks, to mount an elongate brush to be rotatable about its axis between end mountings movable in synchronism between one end of a path of movement and the other, so that in use the brush is applied over a rectangular area. One example of apparatus for cleaning tower block window glazing is described in U.K. Patent Specification No. 1154983, from which it is readily apparent that this known apparatus is clearly not suited to cleaning non-planar glazed roof structures, for example of the atrium-type or the barrel arch-type.

THE INVENTION

According to one aspect of the invention, there is provided apparatus for cleaning the glazing of a non-planar glazed roofing structure, comprising an elongate brush mounted to be rotatable about its axis between end mountings movable not necessarily in synchronism each between one end of a path of movement and the other, wherein the brush is so constructed as to be able to change its effective length between its end mountings.

The elongate brush may have either a straight longitudinal axis or a curved longitudinal axis.

A straight brush is employed in a first embodiment for cleaning atrium-type glazing which includes one or more triangular glazing sections at the ends of a planar area of glass forming part of the glazed roof structure.

A curved brush is employed in a second embodiment for cleaning a barrel arch-type roof structure incorporating semi-cylindrical glazing extending lengthwise around an angle or corner.

In both embodiments, one end mounting for the brush is required to continue movement for a period during which the other end mounting is substantially stationary, i.e. to clean the above-mentioned triangular glazing section or to traverse the above-mentioned angle or corner.

According to another aspect of the invention, therefore, apparatus for cleaning a non-planar glazed roofing structure comprises an elongate brush mounted to be rotatable about its axis between end mountings movable each between one end of a path of movement and the other, and driving means for moving at least one end mounting along at least part of its path of movement independently of the other end mounting.

The drive means thus enables one end mounting to move differently from the other, i.e. not in synchronism. When the two end mountings move in non-synchronised relationship, the brush is required to change its length due to the change in spacing between the end mountings which occurs during non-synchronised relative movement.

In the first embodiment above-mentioned, where a substantial change in length of the straight brush is often necessary, the brush may be formed in two parts slidable relative to one another, e.g. telescopically, along the axis of the brush.

In the second embodiment above-mentioned, where a smaller change in length of the curved brush will often be sufficient to enable it to stretch or expand into an angle or corner, the curved brush may have a resilient core normally, i.e. when the two end mountings are moving in synchronism along parallel straight paths, under a degree of compression along its length.

In both embodiments, the brush end mountings may comprise miniature carriages themselves mounted to slide along guide rails fixed to the building exterior, e.g. the brickwork or atrium apex, adjacent the respective longitudinal edges of the glazed roof structure. An electric motor carried by one of the carriages drives the brush in rotation about its axis. At least one end mounting is preferably driven along its associated rail by means of a helical drive shaft extending parallel to the rail, the helical drive shaft itself being drivable in rotation by a stepper motor. In the second embodiment, two independent stepper motors are employed, and a sensor detects the position of a brush end mounting along the rail and feeds back a signal to stop one of the stepper motors during a period of non-synchronised relative movement of the end mountings. In the first embodiment only a single stepper motor is used, i.e. only one end mounting is driven, and pivotal connections between the respective end mountings and the brush enable the said one end mounting to continue to move after the other end mounting has encountered a stop. A rack and pinion drive may alternatively be used.

The apparatus preferably also includes a water spray system, of which the spray nozzles may be carried by the guide rails. Water may also be pumped into the central tube of the brush and dispersed through the bristles.

DESCRIPTION OF DRAWINGS

Further features of the invention will be apparent from the following descriptions of two embodiments of apparatus for cleaning roof glazing, making reference to the accompanying drawings, of which FIGS. 1 to 8 relate to a first embodiment and FIGS. 9 to 13 relate to a second embodiment, and wherein.

DESCRIPTION OF EMBODIMENTS

Figure 1:
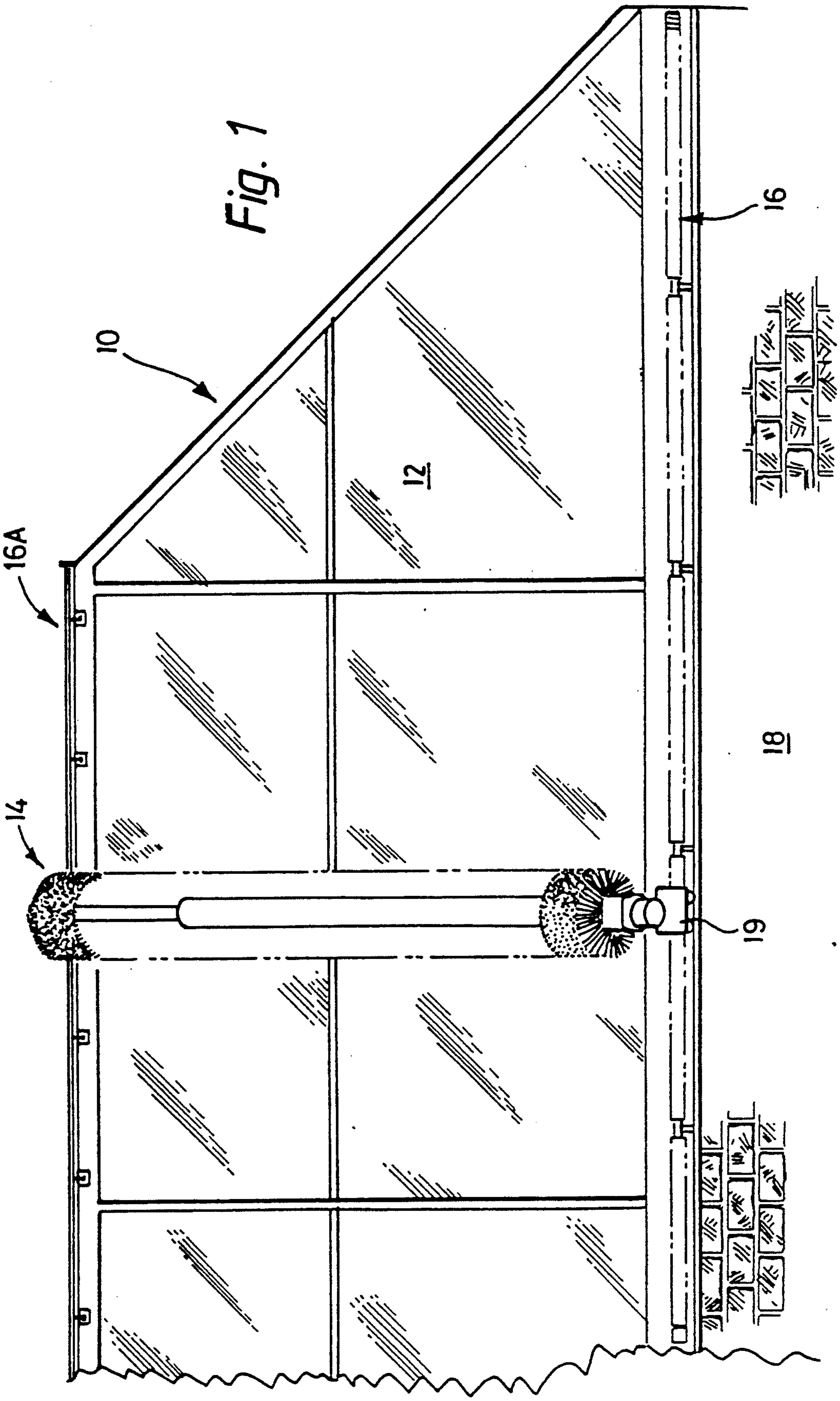
FIG. 1 is a side elevational view of an atrium-type glazed roof structure with the first embodiment of cleaning apparatus mounted thereto.
Figure 2:
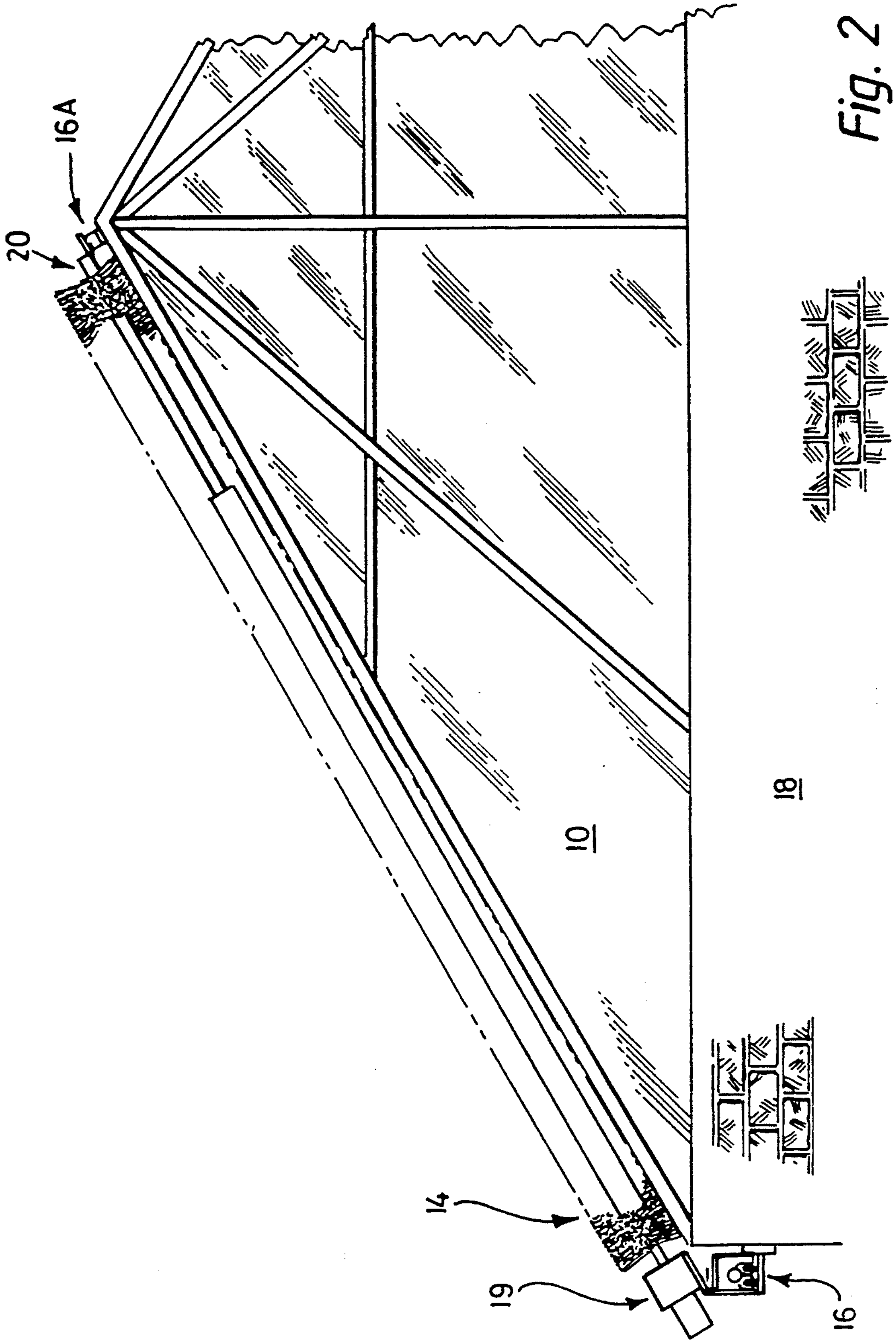
FIG. 2 is an end elevational view of the roof structure.

Referring to FIGS. 1 to 8, the atrium-type roof structure 10 shown in FIGS. 1 and 2 includes a triangular section of glazing 12 at the end of one side. The cleaning apparatus includes a rotating brush 14 adapted to clean the one side of the glazed roof structure, including the triangular section 12, without overlap of the brush into the space where no glazing exists.

For this purpose, the rotating brush 14 is driven to sweep across the glazing, from left to right in FIG. 1, with the upper and lower ends of the brush moving equally and in synchronism, until it reaches the beginning of the triangular section 12, where the upper end of the brush is stopped, whilst the lower end continues to move to the right, accompanied by elongation of the brush, in order to sweep the triangular section 12. The brush is then returned from right to left into a parking shelter (not shown) at the left-hand end of the glazed structure, whereat an analogous triangular end section may have been cleaned in similar manner at the beginning of the preceding left to right sweep.

In order to accomplish the foregoing, two guide rails 16, 16A are fixed to the building exterior, one along the brickwork 18 adjacent the base of the glazed structure and one along the apex of the atrium roof, and the rotating brush 14 is supported between two end mountings 19, 20 in the form of small carriages which run along the rails. Details of the lower carriage are later described with reference to FIGS. 4 and 5 and details of the upper carriage with reference to FIGS. 6 and 7.

Figure 3A:
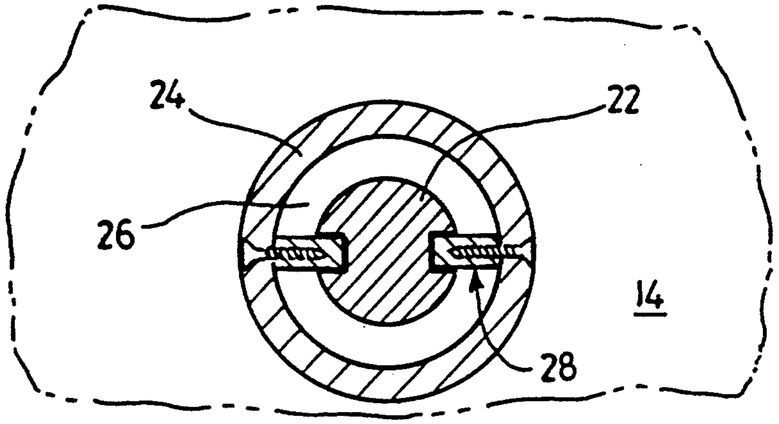
FIGS. 3A and 3B show details of the brush construction.
Figure 3B:
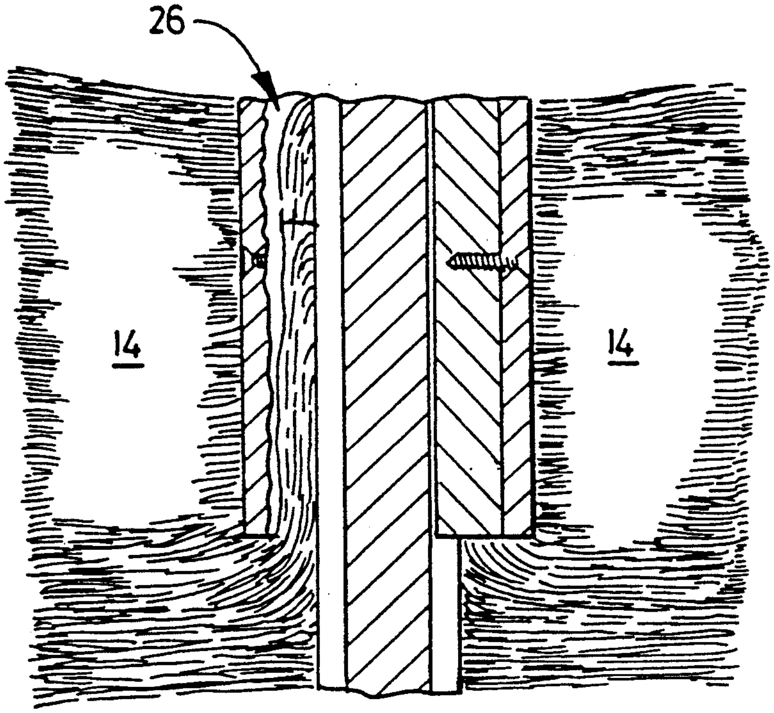

FIGS. 3A and 3B show the construction of the rotating brush 14. It has two telescopically arranged parts 22, 24 each carrying nylon bristles or filaments. When the inner part 22 is retracted into the outer tubular part 24, the nylon bristles on the inner part collapse and are accommodated in an annular space 26 formed between the two parts. Reference 28 in FIG. 3A denotes the guide means on which the two parts of the brush slide relative to one another along the axis of the brush. Such relative sliding movement is produced automatically when the two brush end mountings 19, 20 become increasingly spaced, i.e. when the triangular section 12 is being swept.

Figure 4:
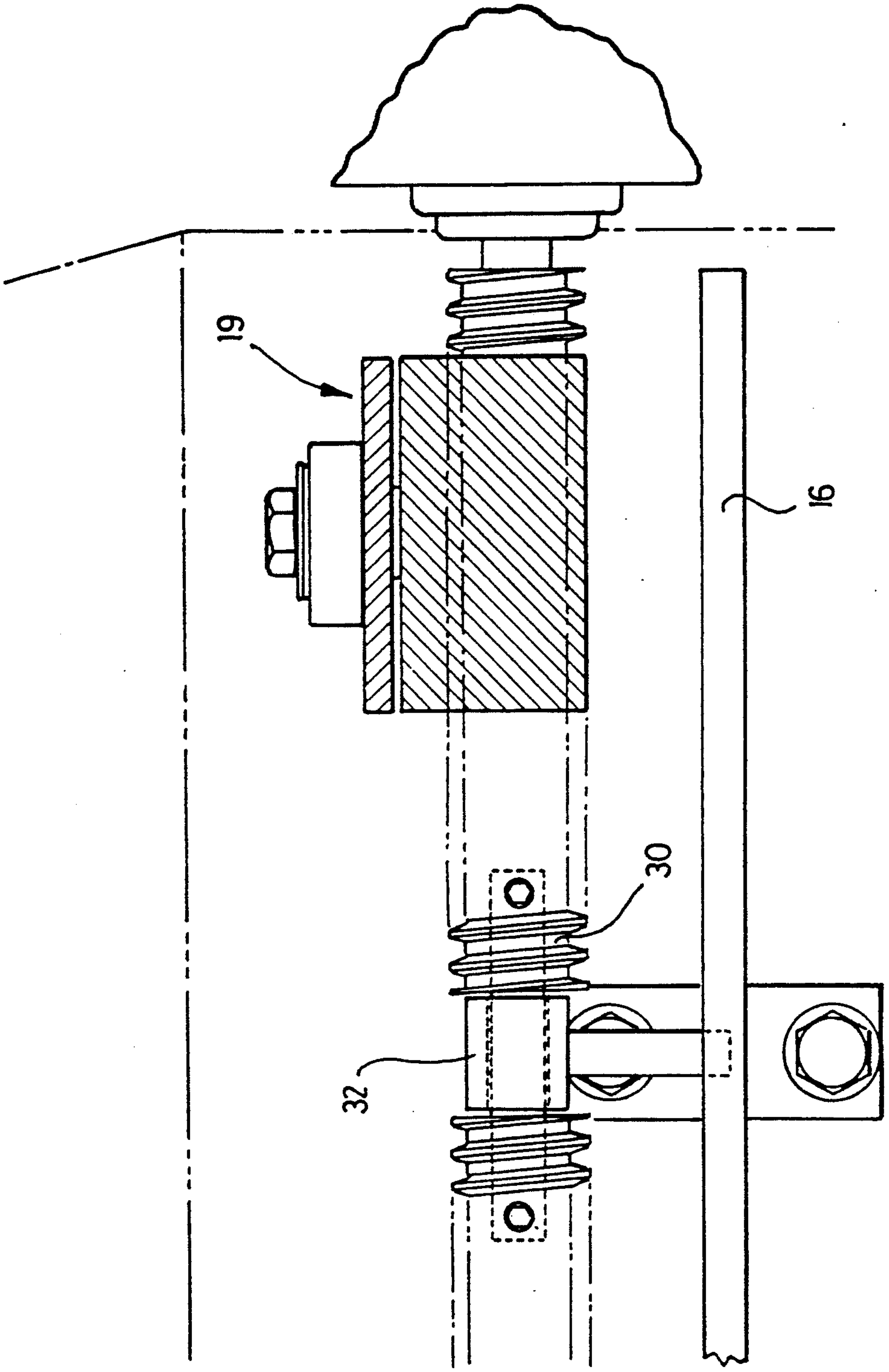
FIGS. 4 and 5 show details of the brush drive at the atrium base.
Figure 5:
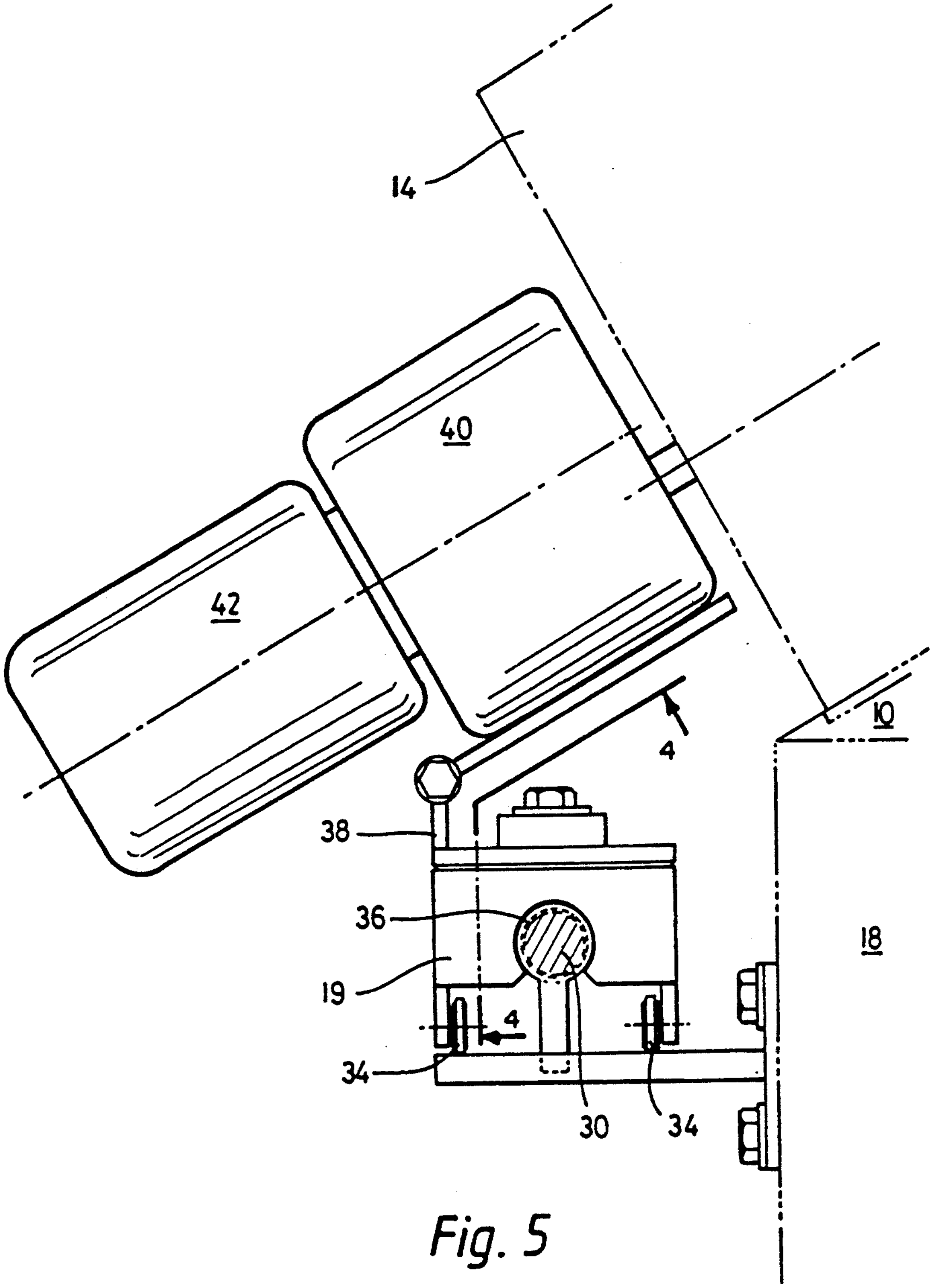

FIGS. 4 and 5 show the lower carriage 19 and parts associated therewith, in side and end view. The carriage 19 is driven along the rail 16 by a helical drive shaft 30 rotatably supported by the rail in bearing blocks 32. The carriage 19 itself runs on the rail through stabilising wheels 34, and incorporates a helical nut 36 cooperating with the drive shaft.

A hinged plate 38 carries a bearing block 40 rotatably supporting one end of the brush 14, and an electric motor 42 is provided to drive the brush in rotation. Hinged plate 38 allows the angular orientation of the brush to change when the triangular section 12 is being swept. It should be mentioned, for reasons of clarity, that the carriage block 19 is shown in cross-section in FIG. 4, taken on the line 4—4 of FIG. 5.

Figure 6:
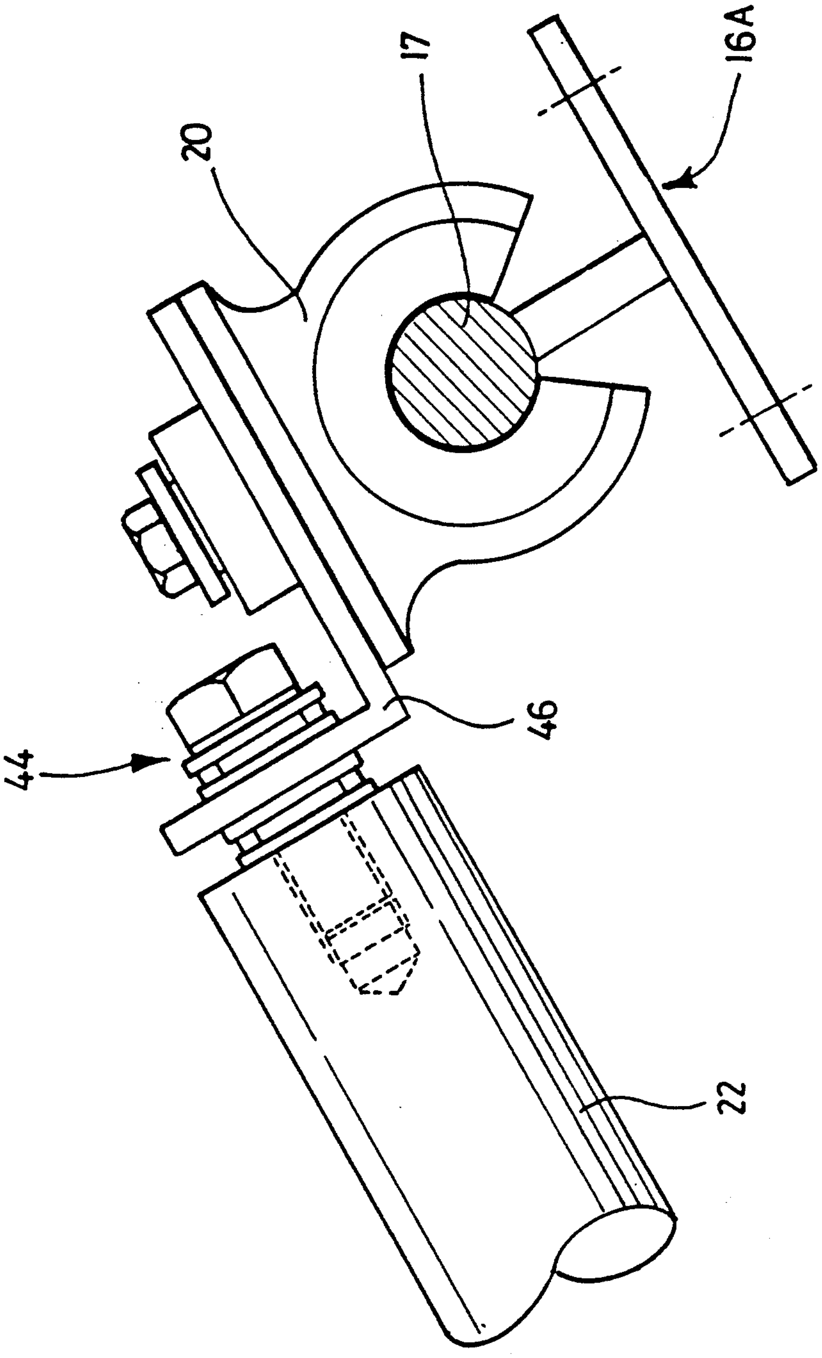
FIGS. 6 and 7 show details of alternative designs of the brush mounting at the atrium apex.

FIG. 6 shows one design of the upper carriage 20 and parts associated therewith. The guide rail 16A in this design includes a round guide bar 17 along which the carriage can rotate as well as slide linearly. The rotational movement of the carriage 20 around the guide bar 17 allows the angular orientation of the brush 14 to change, so that a hinged plate is not required. Instead, the upper end of the brush 14 is rotatably supported by a bearing assembly 44 carried by an angle member 46 fixed to the carriage 20.

Figure 7:
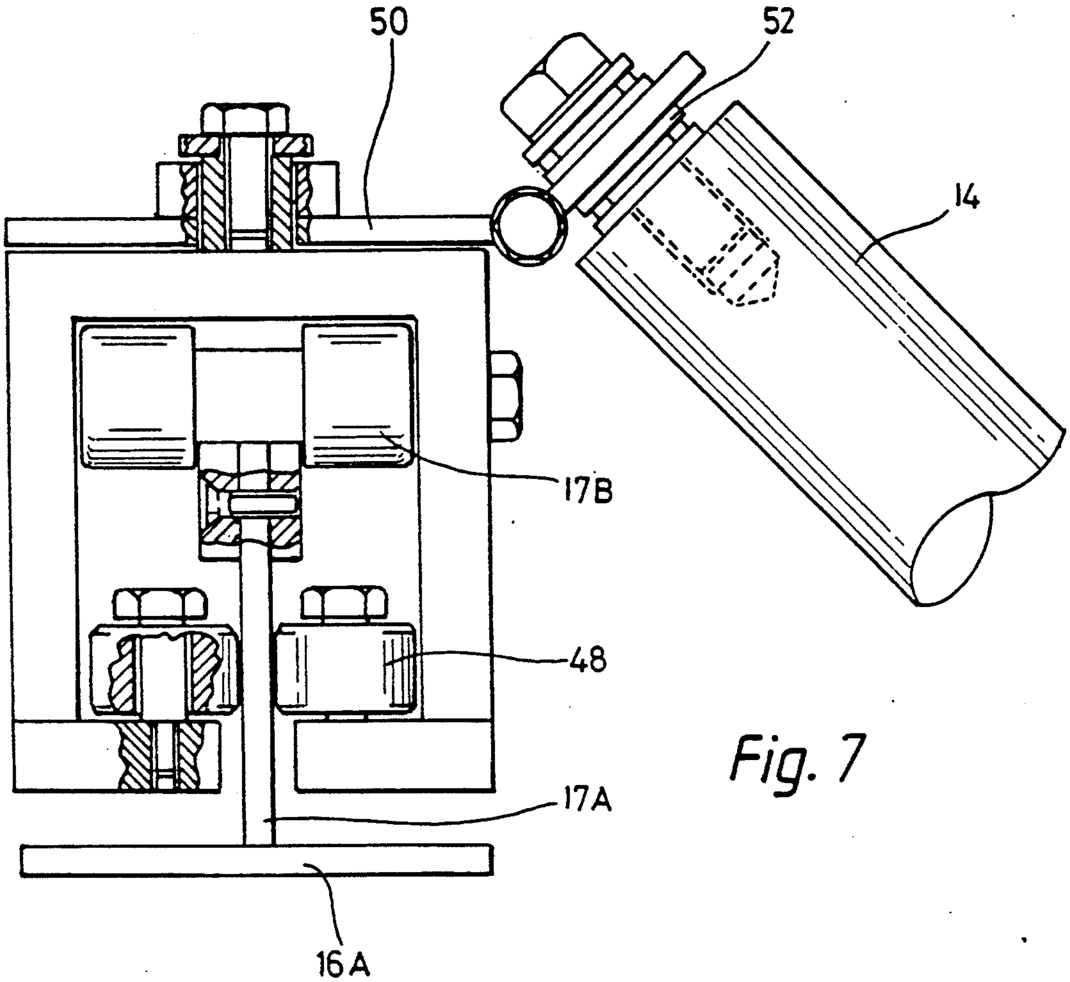

An alternative design of the carriage 20 is shown in FIG. 7. In this case the guide rail 16A has a central web 17A supporting a pair of rollers 17B on which the carriage runs, guided by further rollers 48 on the carriage and cooperating with the central web of the guide rail. A hinged plate 50 supports a bearing assembly 52 for the upper end of the rotating brush 14. The hinged plate 50 allows the brush to change its angular orientation when the triangular section 12 of the roof glazing is being swept.

Figure 8:
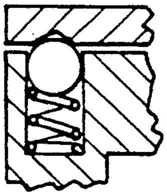
FIG. 8 shows detail of a spring detent.

FIG. 8 shows the detail of a locking detent means employed, at the position indicated in FIG. 7, to lock the hinged plate carrying the rotating brush in its normal position, i.e. in the appropriate angular orientation when the main length of glazing is being swept and the two brush end mountings are moving in synchronism.

Water spray nozzles appertaining to a water spray system may also be carried by the guide rails.

Figure 9:
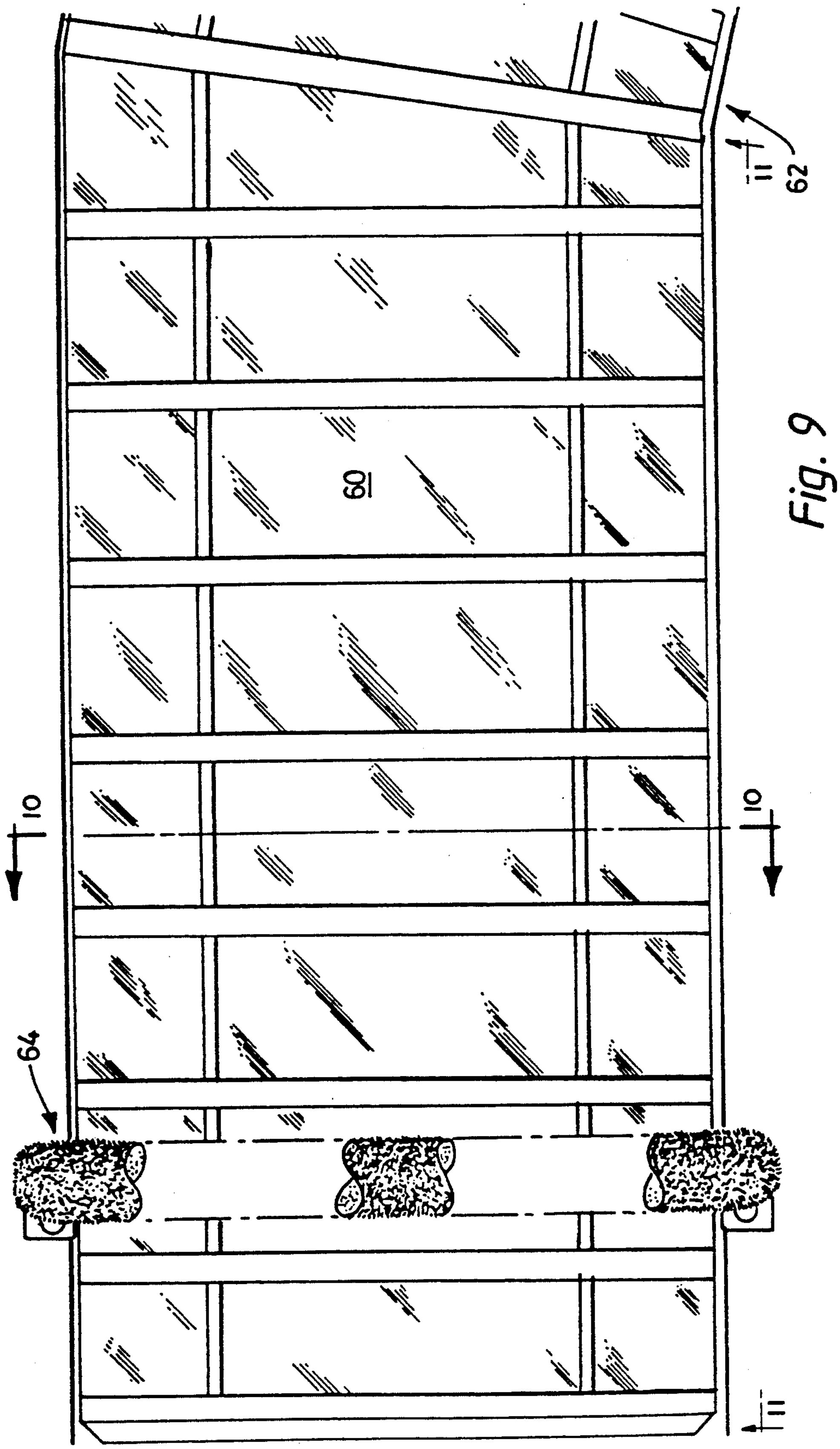
FIG. 9 is a plan view of a barrel arch-type glazed roof structure with a second embodiment of cleaning apparatus mounted thereto.
Figure 10:
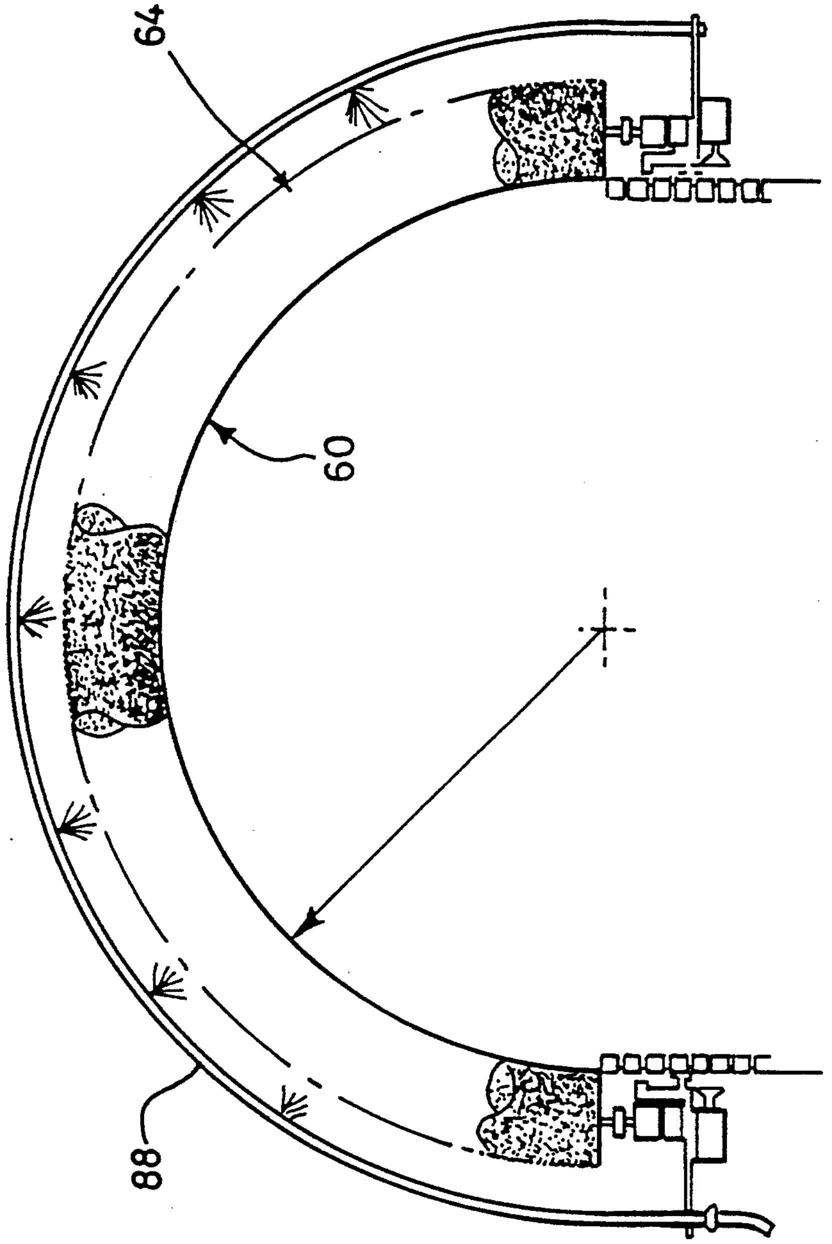
FIG. 10 is a cross-sectional view on the line 10—10 of FIG. 9.
Figure 11:
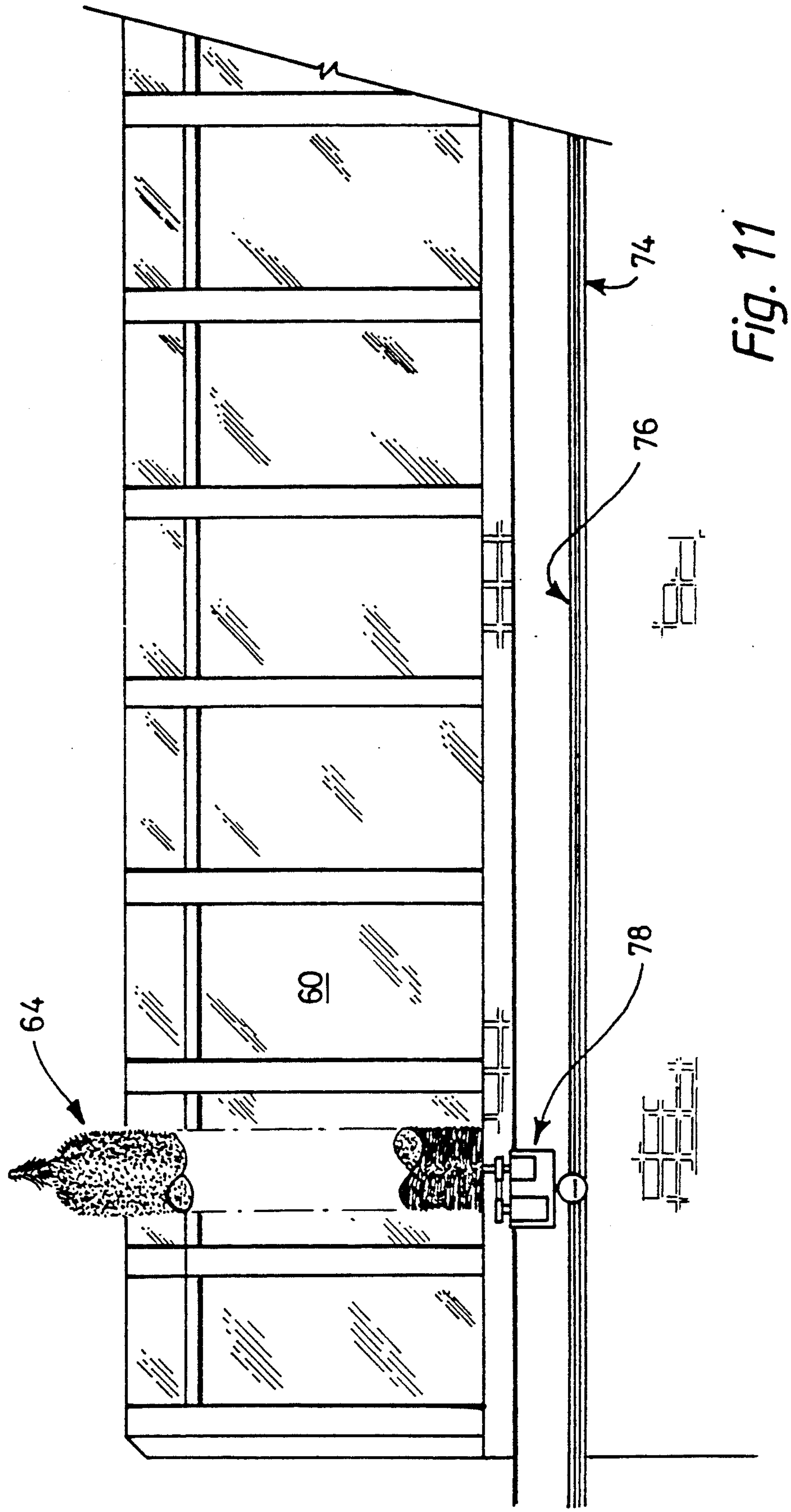
FIG. 11 is a side view in the direction of lines 11—11 in FIG. 9.

Referring now to FIGS. 9 to 13, there is shown in FIGS. 9 to 11 a barrel arch-type glazed roof structure 60 which is being cleaned by an arcuately curved brush 64 rotating about its curved axis. The arched roof structure includes an angle region 62 at which it changes direction, shown on the extreme right-hand side of FIG. 9. The brush 64 is driven along the arched glazed structure by drive means operable independently of one another at both ends of the brush, so that when the angle change 62 is reached, the drive can continue around the outside of the angle while the drive at the inside of the angle is stopped.

Figure 12:
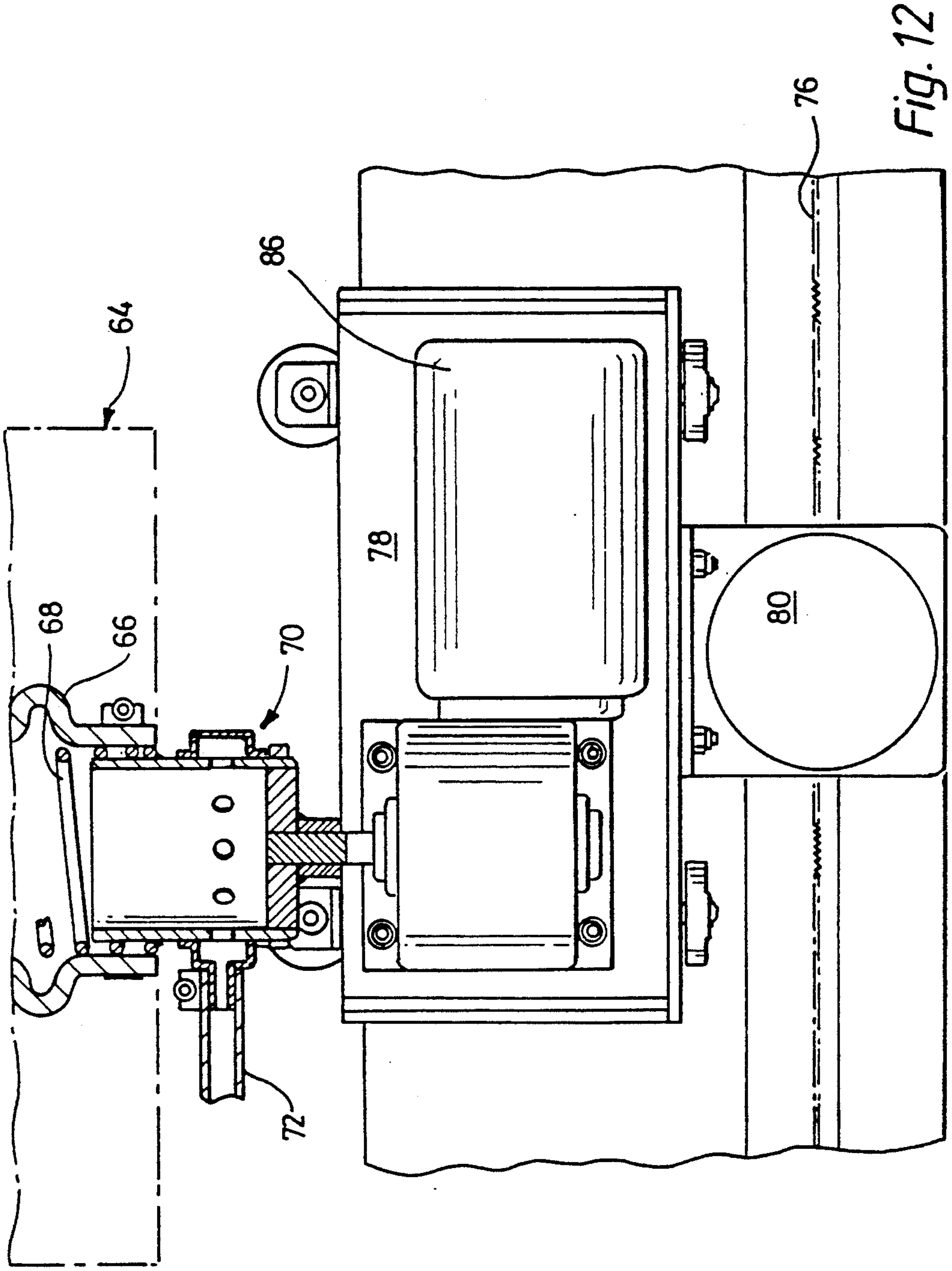
FIGS. 12 and 13 show details of the brush mountings and drives.

As shown in FIG. 12, in order to provide the necessary elongation of the brush 64 when the angle change 62 is being traversed, and to enable the brush to stretch into the angle for efficient cleaning, the brush is provided with a corrugated rubber core tube 66 accommodating a highly flexible spring 68. The core tube 66 is fitted to a tubular end stub 70 to which a water tube 72 is attached. The end stub 70 is apertured to emit jets of water supplied through the water hose. It is alternatively possible to employ a perforated core tube 72 emitting water directly into the brush bristles.

Figure 13:
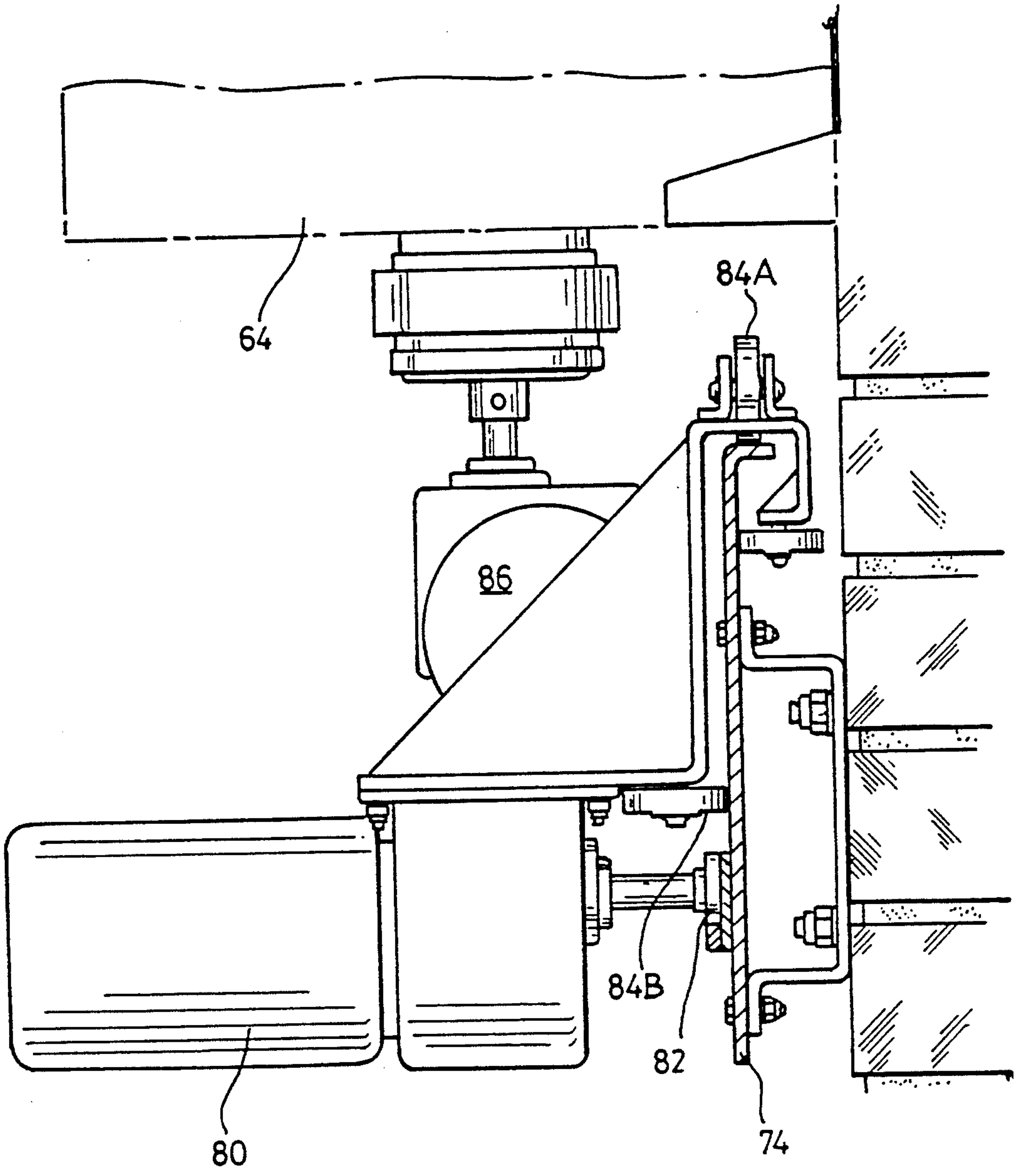

It will be appreciated that the drives at both ends of the curved rotating brush 64 can be identical, and FIGS. 12 and 13 serve to show one convenient arrangement.

Thus, on each side of the barrel arch roof structure, a shaped guide rail 74 incorporating a precision linear rack 76 is fixed to the brickwork of the building. The guide rail and rack follows precisely the profile, including angle changes, of the roof structure. A carriage 78, fixedly carrying the above-described end fitting stub for the brush 64, carries a stepper motor and gear box 80 driving a spur gear pinion 82 cooperating with the rack 76. Additionally the carriage 78 is equipped with guide rollers 84A, 84B which cooperate with the shaped guide rail. The carriage also carries an encoder controlled electric motor and gear box 86 for driving the brush in rotation about its curved longitudinal axis. Thus, the brush is rotated synchronously from both ends.

In use, by means of a sensing device (not shown), the stepper motor 80 on the outside of the angle at the change in roof direction continues to drive while the stepper motor 80 on the inside of the angle is stopped. At this time the curved brush extends to stretch into the corner of the angle in the roof glazing.

After sweeping the full length of the glazing of the arched roof structure, the carriages return the brush to a parking shelter.

Reference 88 in FIG. 10 denotes an additional or alternative water spray system.

Various modifications of the above-described arrangements are possible within the scope of the invention defined by the appended claims.

Figure 14:
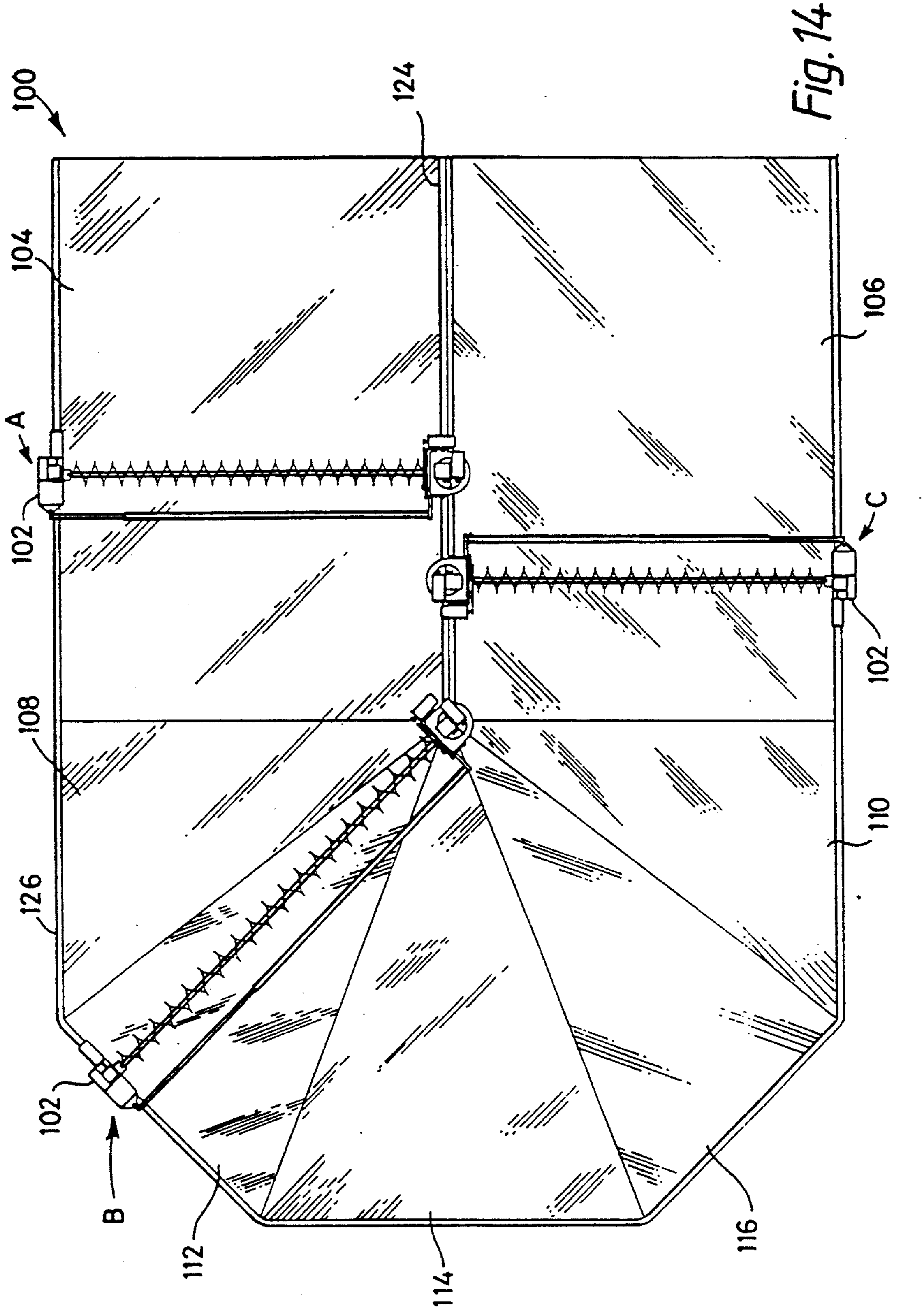
FIG. 14 is a plan view of a glazed roof structure with an alternative type of apparatus shown in three possible positions.

FIG. 14 shows an atrium-type glazed structure 100 on which an alternative type of cleaning assembly 102 is mounted. The structure 100 includes two inclined faces 104, 106 which run along opposite sides of the structure 100, and include (at one end) two corresponding triangular sections, respectively referenced 108 and 110. Three angled triangular glazed sections 112, 114 and 116 span the width of the structure 100 at one end of the latter.

In use, the cleaning apparatus 102 sweeps along the face 104 from right to left as viewed in FIG. 14, around the angled sections 112, 114, 116 and then along the face 106 from left to right. The cleaning apparatus 102 is shown in three positions, respectively indicated by the arrows A, B and C which respectively correspond to one position of the apparatus 102 during one of the three sweeping actions explained above.

Figure 15:
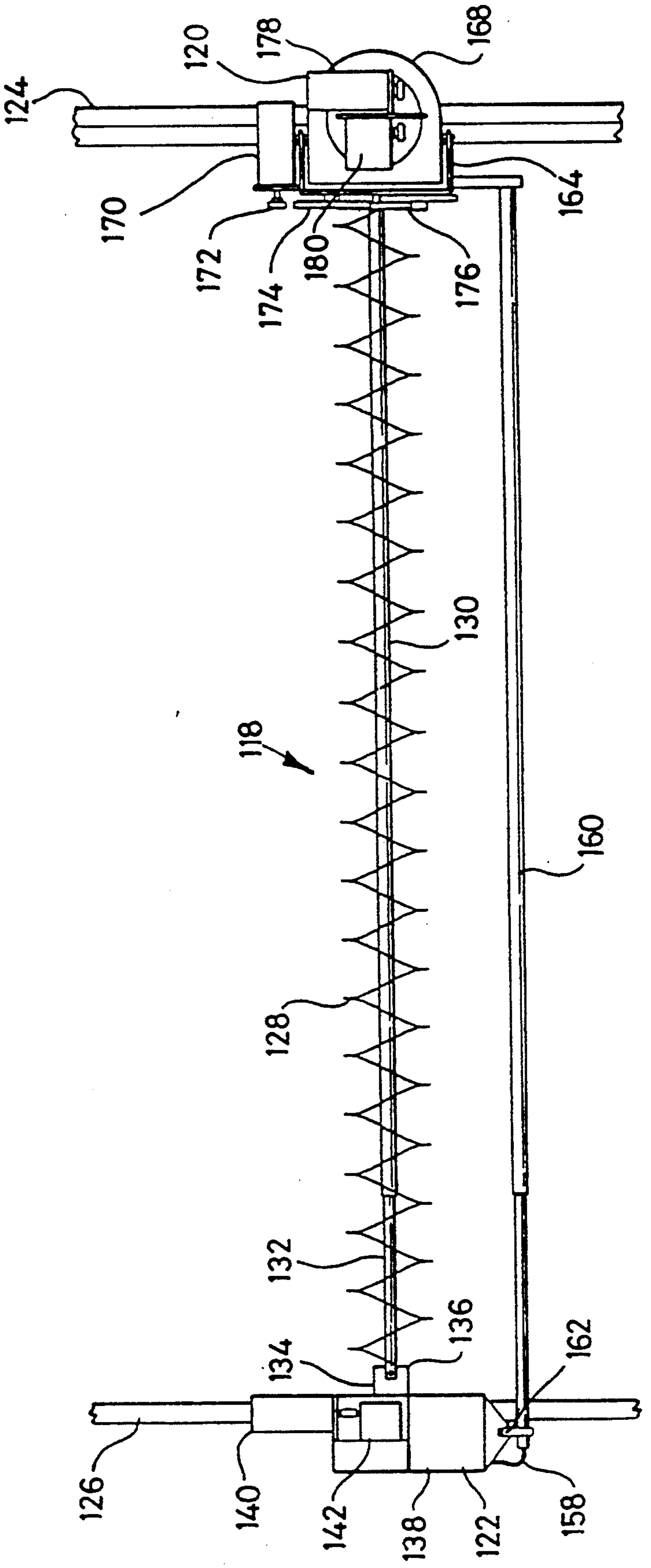
FIG. 15 is a plan view of the alternative type of cleaning apparatus.
Figure 16:
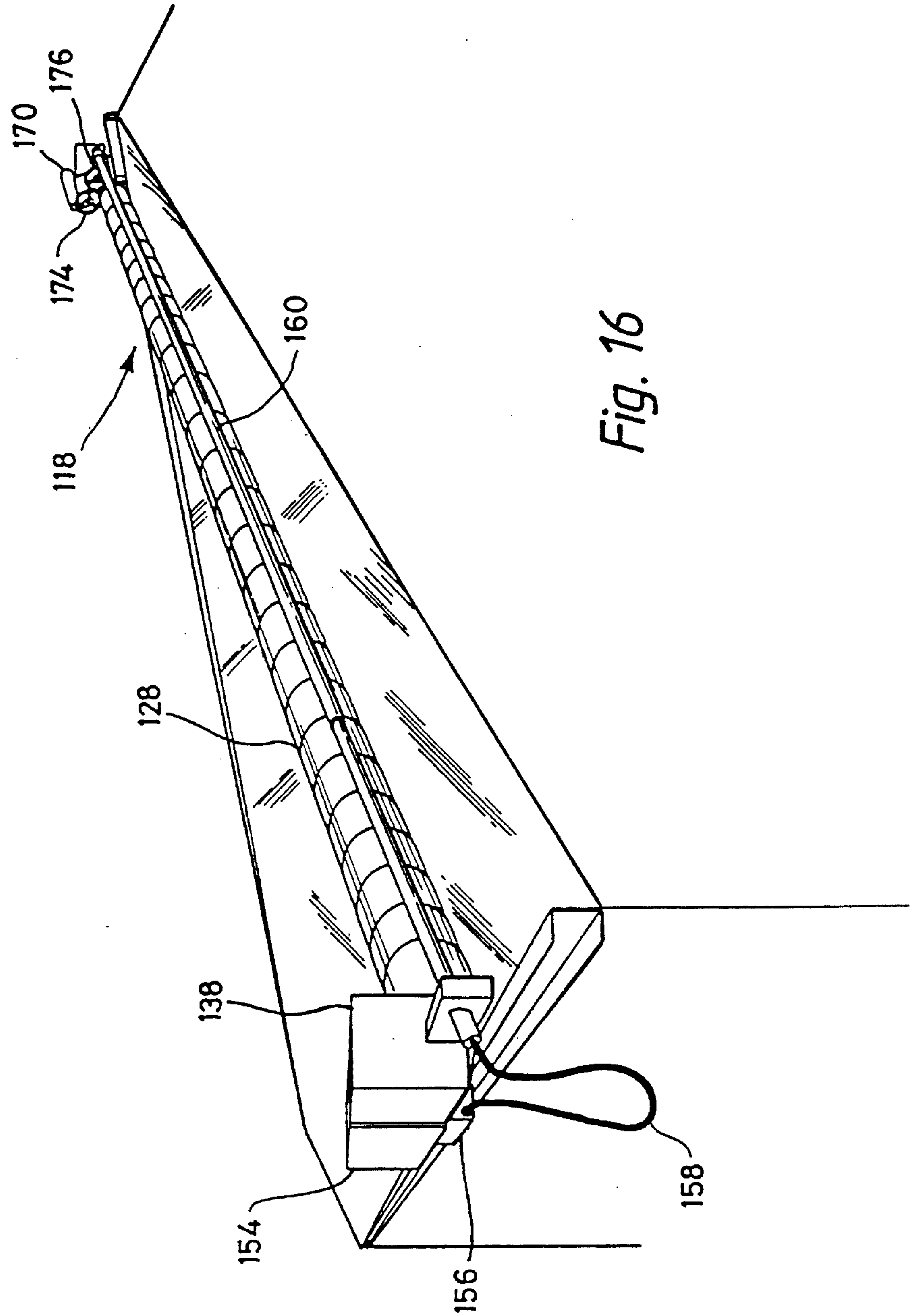
FIG. 16 is a perspective view of part of an atrium-type glazed roof structure with the alternative type of cleaning apparatus mounted thereon.
Figure 17:
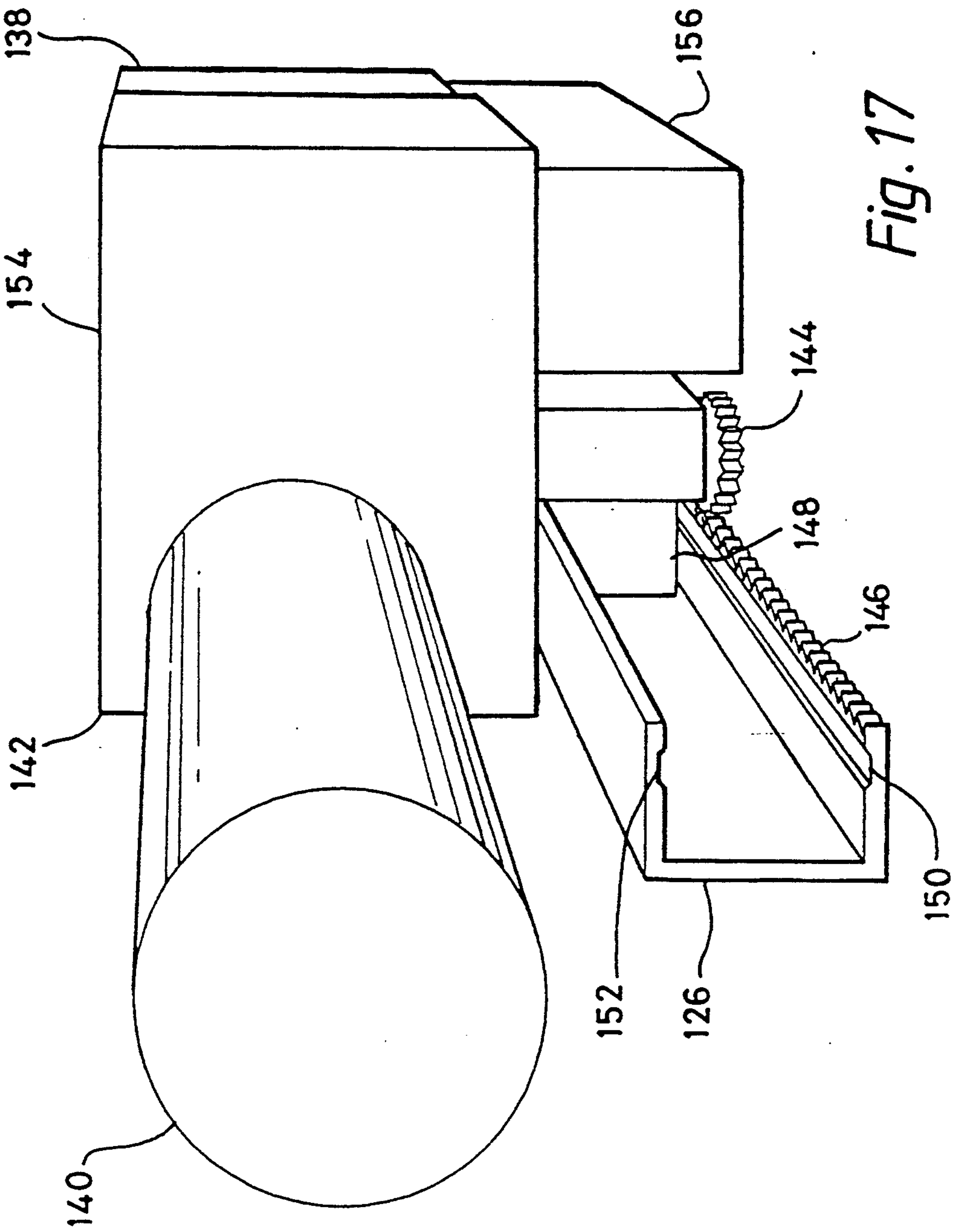
FIG. 17 shows details of the lower drive unit for the alternative type of apparatus.

With reference to FIG. 15, the cleaning apparatus 102 comprises a brush assembly 118 rotatably mounted at one end on an upper carriage 120, and at the other end on a lower carriage 122. The upper carriage 120 is mounted on a rail 124 at the apex of the structure 100, and the lower carriage 122 on a lower channel section rail 126. The rail 24 includes two opposed c-section guides which run one alone each side of the rail 124.

The brush assembly itself comprises a resiliently flexible helical member 128 attached at its opposite ends to a central core comprising two telescopically arranged rods 130 and 132. One end of the rod 132 is mounted on a protruberance 134 at a pivot 136 which enables the rod 132 to pivot about a vertical axis. The protruberance 134 is, in turn, rotatably mounted on the lower carriage 122.

The carriage 122 comprises a housing 138 for a battery which provides the power to operate a motor 140 mounted at one end of the carriage 122. The output of the motor 140 is connected to a drive unit gear box 142 the output of which is, in turn, connected to a drive gear wheel 144 which meshes with a row of teeth 146 in the guide rail 126 to form a rack and pinion type drive for the carriage 122. The lower carriage is located in position relative to the rail 126 by a protruberance 148 which carries two upper and two lower bearings (not shown) which may engage in tracks 150 and 152 in the rail.

The lower carriage 122 additionally includes control circuitry, housed in control box 154, for controlling the operation of the apparatus, and an isolator switch, contained in housing 156 for overriding the control circuitry when, for example, maintenance work is to be carried out on the apparatus.

The control circuitry and battery are connected to the upper carriage 120 by means of a cable 158 which extends through a telescopic conduit 160. One end region of the conduit 160 is connected to the carriage 122 at pivot 162 which enables the conduit 160 to pivot relative to the carriage 122 about a vertical axis. The other end of the conduit 160 is connected to a bracket 164 which is, in turn, mounted on a base plate 168 for pivotal movement relative to the latter about a horizontal axis.

The bracket 164 also carries a motor 170, an intermediate gear wheel 174 and a gear wheel 176 connected to the rod 130. The output 172 of the motor 170 is connected to the gear wheel 174 by means of a chain (not shown) so that the motor 170 is operable to rotate the brush 118 about the axis defined by the brush core 130.

The upper carriage also includes a protruberance (not shown) similar to the protruberance 148, which engages in either of the two c-section guide (each of which has an upper and lower track for the ball bearings). Each c-section guide also includes a row of teeth running along its length which may mesh with a pinion wheel (not shown) on the upper carriage 120.

The pinion wheel on the upper carriage 120 is rotated by means of a motor 178 driving through a gearbox 180 connected to the motor 178 by a chain (not shown). Thus the upper carriage 120, like the lower carriage 122, is driven by means of a rack and pinion type drive system.

At the right hand end of the rail 124 as viewed in FIG. 14, the c-section track, and the associated rack of teeth, is curved through 180 degrees so that the upper carriage 120, when at the left hand end of the rail 124 may be transferred from c-section one side of the rail 24 to the other.

In use, under the control of the control circuitry, the motors 140 and 178 drive the assembly along the rails 124 and 126, while the motor 170 rotates the brush 118. When the upper carriage 120 reaches the left hand end (as viewed in FIG. 14) of the rail 124 it travels around the end of the rail 124 while the motor 140 continues to drive the lower carriage 122 along the rail 126 around the base of the sections 108, 112, 114, 116 and 110 this movement causes an elongation of the brush 118, whilst any variation of the orientation of the axis of the brush 118 and the conduit 116 relative to the carriages 120 and 122 may be accommodated by pivoting of the brush 118 and conduit 160 about their respective pivots 136 and 162 and by the pivoting of the bracket 164.

In an alternative embodiment of the invention, the helical member 128 may carry a number of radial bristles.

In addition, the carriages 120 and 122 may be equipped with sensors which generate signals responsive to markers (not shown) on the rails 124 and 126 to provide an indication as to whether the brush 118 is perpendicular to the rails 126 and 124 as the assembly sweeps along the faces 104 and 106.

As with the apparatus shown in FIGS. 1 and 8, the guide rails may additionally carry spray nozzles appertaining to a water spray system.

I claim:

1. Apparatus for cleaning the glazing of a non-planar glazed roofing structure, the apparatus comprising an elongate brush; means for driving the brush along a path of movement so as to sweep the brush across the glazing; two end mountings on each of which the brush is mounted at a respective end region thereof for rotation about its longitudinal axis, the end mountings being independently movable between one end of said path of movement of the brush and the other end of said path; first driving means for rotating the brush about its elongate axis independently of said movement of the end mountings, wherein the brush includes length varying means for enabling the brush to change its effective length between the end mountings when said end mountings move relative to each other, during the movement of the brush along said path.

2. Apparatus according to claim 1, wherein the brush has a straight longitudinal axis.

3. Apparatus according to claim 2, wherein the length varying means comprises two parts of the brush which are relatively slidable along the longitudinal axis of the brush in order to change the effective length of the brush.

4. Apparatus according to claim 3, wherein the two parts of the brush are arranged telescopically.

5. Apparatus according to claim 1, wherein the brush has a curved longitudinal axis.

6. Apparatus according to claim 5, wherein the brush has a resilient core normally under a degree of compression along its length, whereby the curved brush is able to stretch or expand into an angle or corner in the surface of the roofing structure to be cleaned.

7. Apparatus according to claim 1, wherein the end mountings comprise miniature carriages mounted on rails fixed to said roofing structure.

8. Apparatus according to claim 7, wherein the first driving means comprises an electric motor carried by one of the carriages.

9. Apparatus according to claim 7, wherein at least one end mounting is driven along its associated guide rail by means of a helical drive shaft extending parallel to the rail, the helical drive shaft itself being drivable in rotation by a stepper motor.

10. Apparatus according to claim 7, wherein the brush has a straight longitudinal axis and wherein one of the end mountings is driven by a stepper motor, and pivotal connections between the respective end mountings and the brush enable said one end mounting to continue to move after the other end mounting has reached a stop position.

11. Apparatus for cleaning the glazing of a non-planar glazed roofing structure, the apparatus comprising an elongate brush; driving means for rotating the brush about its longitudinal axis and for driving the brush along a path of movement so as to sweep the brush across the glazing; two end mountings on each of which the brush is mounted at a respective end region thereof for rotation about its longitudinal axis, each said end mounting being moveable between one end of the path of movement of the brush and the other end of said path; said driving means comprising first driving means for rotating the brush about its longitudinal axis independently of said movement of the end mountings and second driving means for moving at least one end mounting along at least part of its path of movement independently of the other end mounting.

12. Apparatus according to claim 11, wherein the end mountings comprise miniature carriages mounted on rails fixed to said roofing structure.

13. Apparatus according to claim 12, wherein the first driving means comprises an electric motor carried by one of the carriages.

14. Apparatus according to claim 11, in which the brush comprises a resiliently flexible helical member, and the brush is resiliently flexible so that it can change its effective length in use.

15. Apparatus according to claim 14 in which an array of bristles is carried by the helical member.

* * * * *